C. P. NOLTE.
PACKING.
APPLICATION FILED OCT. 7, 1919.
1,356,393.
Patented Oct. 19, 1920.
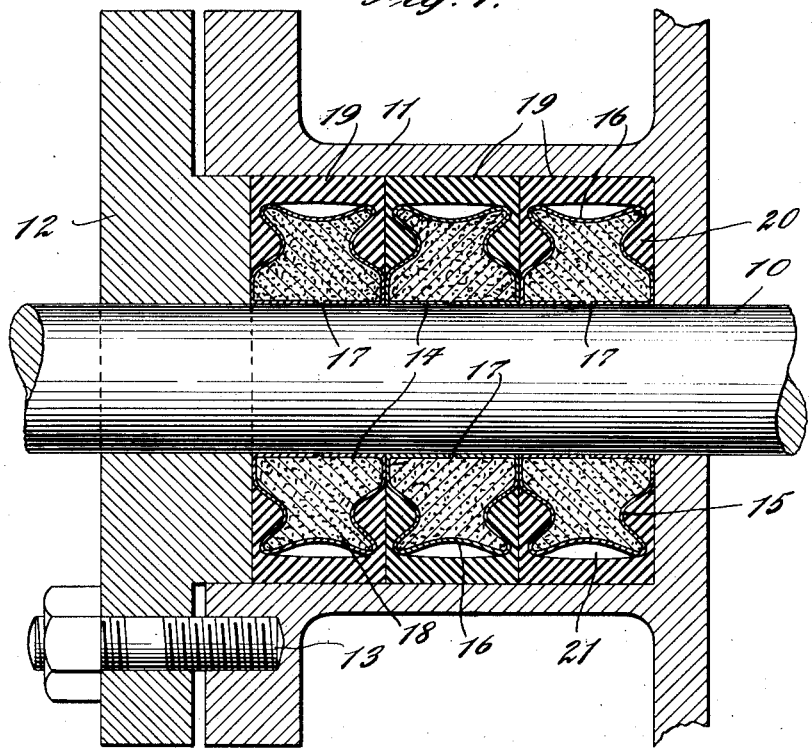
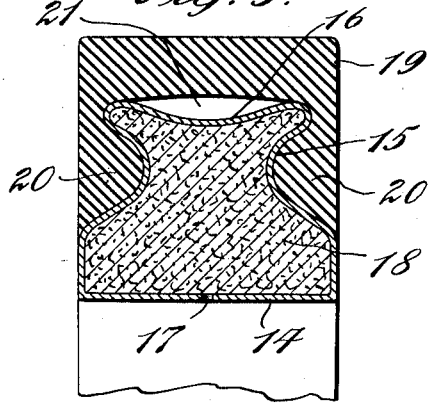
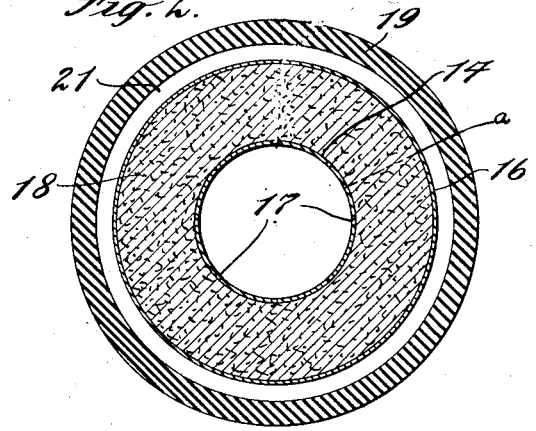
WITNESS:
INVENTOR.
Carl P. Nolte
BY
his ATTORNEYS

UNITED STATES PATENT OFFICE.

CARL P. NOLTE, OF NEW YORK, N. Y.

PACKING.

1,356,393.  Specification of Letters Patent.  Patented Oct. 19, 1920.

Application filed October 7, 1919. Serial No. 329,153.

*To all whom it may concern:*

Be it known that I, CARL P. NOLTE, a citizen of the United States, residing at New York, in the county and State of New York, have invented certain new and useful Improvements in Packings, of which the following is a specification.

My invention has for its object the provision of a packing in which anti-friction metal engages the piston rod or other movable member and is continually kept in engagement therewith during operation. Other objects of my invention will appear from the specification and will be more particularly pointed out in the claims.

My invention will best be understood by reference to the accompanying drawing, in which Figure 1 is a longitudinal section of a stuffing box within which a packing embodying my invention is inclosed; Fig. 2 is a cross section of the packing, and Fig. 3 is a longitudinal section through one of the parts of the packing.

Referring now to the drawing, 10 is a piston rod or the like passing through a stuffing box comprising a stationary portion 11 and provided with a removable cover 12 which is secured to the stationary part by bolts 13 or the like and acts as a gland to compress the packing within the stuffing box. The packing embodying my invention comprises a hollow annular ring 14 provided with a central opening within which the piston rod 10 is closely received. In order to permit the ring to be readily placed over the piston rod, the same is preferably formed from a strip the ends of which form, when in position, a closely fitting joint as at *a*. The ring is composed of anti-friction material, such as Babbitt metal, and is formed with reëntrant sides, as at 15, and at its periphery is formed with a depression, as at 16, the inner wall of the metal ring being provided with one or more openings 17 through which the lubricating material 18, with which the metal ring is adapted to be filled, may flow to the piston rod when the packing is subjected to pressure. The lubricating material may consist of graphite or other fire-test lubricating material. A yielding, flexible ring 19, formed of fiber, rubber or the like, surrounds the metal ring 14 and is provided with projections 20 which conform with and engage the reëntrant sides of the metal ring 14. The outer wall of the metal ring and the inner wall of the outer ring 19 are preferably constructed and arranged to form an air space 21 which acts as a cushion between the two rings, said space being sealed by the projections 20 of the flexible ring.

Now, when the stuffing box is filled with any desired number of the packing rings embodying my invention, here shown as three in number, and are subjected to pressure by forcing inwardly the gland 12, the metal rings surrounding the piston rod will be brought into close engagement therewith and the lubricating material will be continuously fed from the hollow metal ring through the opening 17 to the piston, the air space formed between the metal ring and the outer yielding ring acting as a cushion to assist in maintaining the parts in tight engagement and feeding the lubricant to the piston.

What I claim and desire to secure by Letters Patent of the United States is:

1. A packing comprising a hollow metallic ring formed with reëntrant sides and provided with an opening in its inner wall through which the lubricant with which the ring is adapted to be filled may flow, and a ring formed of flexible, yielding material surrounding said metal ring and provided with projections adapted to engage the reëntrant sides of said metal ring.

2. A packing comprising a hollow ring composed of an anti-friction metal and formed with reëntrant sides and provided with an opening in its inner wall through which the lubricant with which the ring is adapted to be filled may flow, and a ring formed of a flexible, yielding material surrounding said metal ring and provided with projections adapted to engage the reëntrant sides of said metal ring.

3. A packing comprising a hollow metallic ring formed with reëntrant sides and provided with an opening in its inner wall through which the lubricant with which the ring is adapted to be filled may flow, and a ring formed of flexible, yielding material surrounding said metal ring and provided with projections adapted to engage the reëntrant sides of said metal ring, the two rings being constructed and arranged to form a sealed air space between the two.

4. A packing comprising a hollow metallic ring formed with reëntrant sides and provided with an opening in its inner wall through which the lubricant with which the ring is adapted to be filled may flow, a ring formed of flexible, yielding material surrounding said metal ring and provided with projections adapted to engage the reëntrant sides of said metal ring, a stuffing box, and means for compressing the packing within said box.

5. A packing comprising a hollow metallic ring formed with reëntrant sides and provided with an opening in its inner wall through which the lubricant with which the ring is adapted to be filled may flow, a ring formed of flexible, yielding material surrounding said metal ring and provided with projections adapted to engage the reëntrant sides of said metal ring, the two rings being constructed and arranged to form a sealed air space between the two, a stuffing box, and means for compressing said packing within said box.

CARL P. NOLTE.